(12) United States Patent
Ouyang et al.

(10) Patent No.: US 12,524,147 B2
(45) Date of Patent: *Jan. 13, 2026

(54) MODALITY LEARNING ON MOBILE DEVICES

(71) Applicant: Google LLC, Mountain View, CA (US)

(72) Inventors: Yu Ouyang, San Jose, CA (US); Diego Melendo Casado, San Francisco, CA (US); Mohammadinamul Hasan Sheik, San Jose, CA (US); Francoise Beaufays, Mountain View, CA (US); Dragan Zivkovic, Sunnyvale, CA (US); Meltem Oktem, Toronto (CA)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,825

(22) Filed: Nov. 22, 2023

(65) Prior Publication Data

US 2024/0086063 A1    Mar. 14, 2024

Related U.S. Application Data

(63) Continuation of application No. 17/823,545, filed on Aug. 31, 2022, now Pat. No. 11,842,045, which is a
(Continued)

(51) Int. Cl.
*G06F 3/04886*     (2022.01)
*G06F 1/16*        (2006.01)
(Continued)

(52) U.S. Cl.
CPC ........ *G06F 3/04886* (2013.01); *G06F 1/1626* (2013.01); *G06F 3/0233* (2013.01);
(Continued)

(58) Field of Classification Search
CPC .. G06F 3/04886; G06F 40/166; G06F 40/289; G06F 1/1626; G06F 3/0233;
(Continued)

(56) References Cited

U.S. PATENT DOCUMENTS 6,629,073 B1   9/2003  Hon et al.
8,832,589 B2   9/2014  Zhai et al.
(Continued)

FOREIGN PATENT DOCUMENTS

CN        102272827 B        7/2013
KR    10-2013-0006596        1/2013
(Continued)

OTHER PUBLICATIONS

China National Intellectual Property Administration, Notification of First Office Action issued on Oct. 25, 2023, issued in connection with Chinese Patent Application No. 202111185746.0, 27 pages (English Translation).
(Continued)

*Primary Examiner* — Sherrod L Keaton
(74) *Attorney, Agent, or Firm* — McDonnell Boehnen Hulbert & Berghoff LLP

(57) ABSTRACT

Methods, systems, and apparatus, including computer programs encoded on a computer storage medium, for cross input modality learning in a mobile device are disclosed. In one aspect, a method includes activating a first modality user input mode in which user inputs by way of a first modality are recognized using a first modality recognizer; and receiving a user input by way of the first modality. The method includes, obtaining, as a result of the first modality recognizer recognizing the user input, a transcription that includes a particular term; and generating an input context data structure that references at least the particular term. The method further includes, transmitting, by the first modality
(Continued)

recognizer, the input context data structure to a second modality recognizer for use in updating a second modality recognition model associated with the second modality recognizer.

22 Claims, 4 Drawing Sheets

Related U.S. Application Data continuation of application No. 17/064,173, filed on Oct. 6, 2020, now Pat. No. 11,435,898, which is a continuation of application No. 15/393,676, filed on Dec. 29, 2016, now Pat. No. 10,831,366.

(51) Int. Cl.
| | |
|---|---|
| *G06F 3/023* | (2006.01) |
| *G06F 3/04883* | (2022.01) |
| *G06F 3/16* | (2006.01) |
| *G06F 40/166* | (2020.01) |
| *G06F 40/289* | (2020.01) |
| *G10L 15/22* | (2006.01) |

(52) U.S. Cl.
CPC .......... *G06F 3/04883* (2013.01); *G06F 3/167* (2013.01); *G06F 40/166* (2020.01); *G06F 40/289* (2020.01); *G06F 2203/0381* (2013.01); *G10L 15/22* (2013.01)

(58) Field of Classification Search
CPC ................. G06F 3/04883; G06F 3/167; G06F 2203/0381; G10L 15/22
See application file for complete search history.

(56) References Cited

U.S. PATENT DOCUMENTS

| | | | |
|---|---|---|---|
| 10,178,301 | B1 | 1/2019 | Welbourne et al. |
| 2003/0233237 | A1 | 12/2003 | Garside et al. |
| 2004/0243415 | A1 | 12/2004 | Commarford et al. |
| 2006/0190256 | A1 | 8/2006 | Stephanick et al. |
| 2009/0150156 | A1 | 6/2009 | Kennewick et al. |
| 2009/0306980 | A1 | 12/2009 | Shin |
| 2011/0161080 | A1 | 6/2011 | Ballinger et al. |
| 2011/0166851 | A1 | 7/2011 | LeBeau et al. |
| 2011/0202836 | A1 | 8/2011 | Badger et al. |
| 2011/0270820 | A1* | 11/2011 | Agarwal ................. G06F 16/31 707/E17.108 |
| 2013/0226892 | A1 | 8/2013 | Ehsani et al. |
| 2014/0104175 | A1* | 4/2014 | Ouyang ............... G06F 3/04886 345/168 |
| 2014/0201671 | A1 | 7/2014 | Zhai et al. |
| 2014/0282212 | A1* | 9/2014 | Shuster ............... G06F 3/04883 715/780 |
| 2015/0127346 | A1 | 5/2015 | Gruenstein et al. |
| 2015/0287408 | A1* | 10/2015 | Svendsen ................ G10L 15/26 704/235 |
| 2015/0293602 | A1 | 10/2015 | Kay et al. |
| 2015/0294668 | A1 | 10/2015 | LeBeau et al. |
| 2017/0365251 | A1* | 12/2017 | Park ..................... G10L 15/063 |
| 2018/0301144 | A1 | 10/2018 | Park et al. |

FOREIGN PATENT DOCUMENTS

| | | |
|---|---|---|
| KR | 10-2014-0111333 | 9/2014 |
| WO | 2006086511 A2 | 8/2006 |
| WO | 2011/084998 | 7/2011 |
| WO | 2011/113057 | 9/2011 |

OTHER PUBLICATIONS android-developers.com [online]. "Add Voice Typing to you IME," Dec. 2011, 3 pages [retrieved on Dec. 1, 2016] <https://android-developers googleblog.com/2011/12/add-voice-typing-to-your-ime.html>.

Epps et al. "Integration of Speech and Gesture Inputs during Multimodal Interaction," Proc Aust. Intl. COnf. on CHI., 2004, 4 pages.

International Preliminary Examining Authority, Written Opinion of the International Preliminary Examining Authority mailed on Dec. 11, 2018, issued in connection with International Application No. PCT/US2017/042502, filed on Jul. 18, 2017, 6 pages.

International Searching Authority, International Search Report and Written Opinion mailed on Nov. 29, 2017, issued in connection with International Application No. PCT/US2017/042502, filed on Jul. 18, 2017, 13 pages.

Jurafsky, Dan, "Language Modeling: Introduction toN-grams," powerpoint lecture, Stanford University, 2012, 88 pages.

msdn.microsoft.com [online]. "Microsoft Japanese IME Speech Recognition Program," Oct. 2006, 1 page, [retrieved on Nov. 30, 2016] <https://msdn.microsoft.com/en-ns/em-us/library/aa939366(d=printer, y=winembedded.5).aspx>.

* cited by examiner

MODALITY LEARNING ON MOBILE DEVICES

CROSS-REFERENCE TO RELATED APPLICATIONS

This present application is a continuation of U.S. patent application Ser. No. 17/823,545, filed Aug. 31, 2022, which claims priority to U.S. patent application Ser. No. 17/064,173, filed Oct. 6, 2020, (U.S. Pat. No. 11,435,898), which claims priority to U.S. patent application Ser. No. 15/393,676, filed Dec. 29, 2016 (now U.S. Pat. No. 10,813,366), the entire contents of which are herein incorporated by reference.

FIELD

The present specification is related to mobile devices.

BACKGROUND

Smartphones and mobile computing devices are configured to support voice typing which can be enabled when users activate a microphone function of the mobile device. In general, mobile computing devices can include at least two input method editors (IMEs), namely, a keyboard or text IME and a voice or speech IME. The text IME supports physical input and display of digital text, while the voice IME supports voice input and transcription of speech audio. For some mobile or user devices, the keyboard IME can be configured as a default IME and, thus, is the preselected input method option adopted by the device.

When a user of the mobile device activates the microphone function, the user can cause the device to experience a switch from the keyboard IME to the voice IME. In some instances, the switch can be indicated by an illuminated microphone icon viewable on a display of the mobile device. Similarly, while in voice dictation, manual correction of an incorrectly transcribed word can trigger an IME switch to the touch keyboard input method. In some instances, a user can input or type text via the keyboard IME and, when a particular word spelling is unknown, the user can activate the device microphone and elect to input the word by way of voice transcription.

SUMMARY

A computing system is described that includes at least a mobile device having a keyboard IME and voice IME. The described system receives user input by way of a voice input method of a mobile device. The system recognizes the user input and generates a transcription that includes a particular term spoken by the user. The system further generates an input context data structure that references at least the particular term.

The input context data structure can generally include a time and/or date parameter, an indication of an application program associated with the received user input, and one or more n-grams that can include contiguous context items, e.g., letters or words, that are associated with a speech audio input. The speech audio corresponds to the user input received by the voice input method and can include a human speech utterance of the particular term.

The system then transmits the generated input context data structure to a keyboard IME of the mobile device for use in updating one or more language models accessible by the keyboard IME as well as by the voice IME. The input context data structure can also be used to update a global language model that is accessible globally by multiple users of the computing system. The updated language models enable keyboard IMEs and voice IMEs to recognize the particular term when the particular term is once again received as user input by either a voice input method or the keyboard input method of a mobile device.

In one innovative aspect of the specification, a computer-implemented method is described, that includes activating a first modality user input mode in which user inputs by way of a first modality are recognized using a first modality recognizer; and receiving a user input by way of the first modality. The method includes, obtaining, as a result of the first modality recognizer recognizing the user input, a transcription that includes a particular term; and generating an input context data structure that references at least the particular term. The method further includes, transmitting, by the first modality recognizer, the input context data structure to a second modality recognizer for use in updating a second modality recognition model associated with the second modality recognizer.

In some implementations, the method further includes, activating a second modality user input mode in which user inputs by way of the second modality are recognized using the second modality recognizer; receiving a user input by way of the second modality, the user input including the particular term; and in response to transmitting, recognizing, by the second modality recognizer, the particular term received by way of the second modality. In some implementations, recognizing the particular term by the second modality recognizer includes providing, by at least a display of a user device, an indication that the particular term is associated with a language model accessible by the second modality recognizer.

In some implementations, the method further includes, activating the first modality user input mode in response to receiving a user input by way of the second modality, wherein the received user input includes the particular term, and the particular term is not recognized by the second modality recognizer.

In some implementations, the second modality recognizer is configured to: detect an occurrence of user inputs received by way of the second modality that include input context data structures that reference at least the particular term; increment a first data count that tracks a number of occurrences in which input content that reference the particular term is received by way of the second modality; and increment a second data count that tracks a number of occurrences in which user inputs that correspond to the particular term are received by way of the second modality.

In some implementations, the method further includes, generating a database that includes multiple user inputs received by way of the first modality; and using at least one user input of the database of multiple user inputs to update one or more global language models accessible by at least one of the first modality recognizer or the second modality recognizer.

In some implementations, the first modality user input mode includes a voice input mode in which user inputs corresponding to human speech are recognized using the first modality recognizer. In some implementations, the first modality recognizer is a voice input method editor (IME) configured to receive an audio input signal corresponding to human speech that includes an utterance of the particular term.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In another innovative aspect of the specification, a computer-implemented method is described, that includes, activating, in a computing device, a voice user input mode in which user inputs by way of a voice modality are recognized using a voice modality recognizer; and receiving a user input by way of the voice modality. The method includes, obtaining, by the computing device and as a result of the voice modality recognizer recognizing the user input, a transcription that includes a particular term; and generating an input context data structure that references at least the particular term. The method further includes, transmitting, by the voice modality recognizer, the input context data structure to a keyed input modality recognizer for use in updating a keyed modality recognition model associated with the second modality recognizer.

The subject matter described in this specification can be implemented in particular implementations and can result in one or more of the following advantages. The computing system of this specification removes the need to configure or define separate learning models or logic constructs to enhance keyboard IME learning in computing devices. By not coding a multitude of keyboard learning models, computing device processes are optimized and processing efficiency is improved by minimizing unnecessary computations.

Received audio inputs are transcribed and transmitted to a local keyboard IME as well as a global language model for use by a multitude of user devices globally. Keyboard IME enhancements can be efficiently accomplished based on, for example, server-based or local device analysis of audio input signals corresponding to new or evolving speech utterances. Hence, redundant signal analysis of speech and keyboard user inputs of common words is avoided, thereby providing enhanced system bandwidth for other computations and system transmissions.

In addition to the common words, based on the described subject matter, the keyboard IME is now enabled to learn new words using the speech recognition functions of the computing device. For example, a new word can correspond to a term that did not exist before within a particular spoken language or computer language model (e.g., "selfie" or "bae") or a naming for a new place/location.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
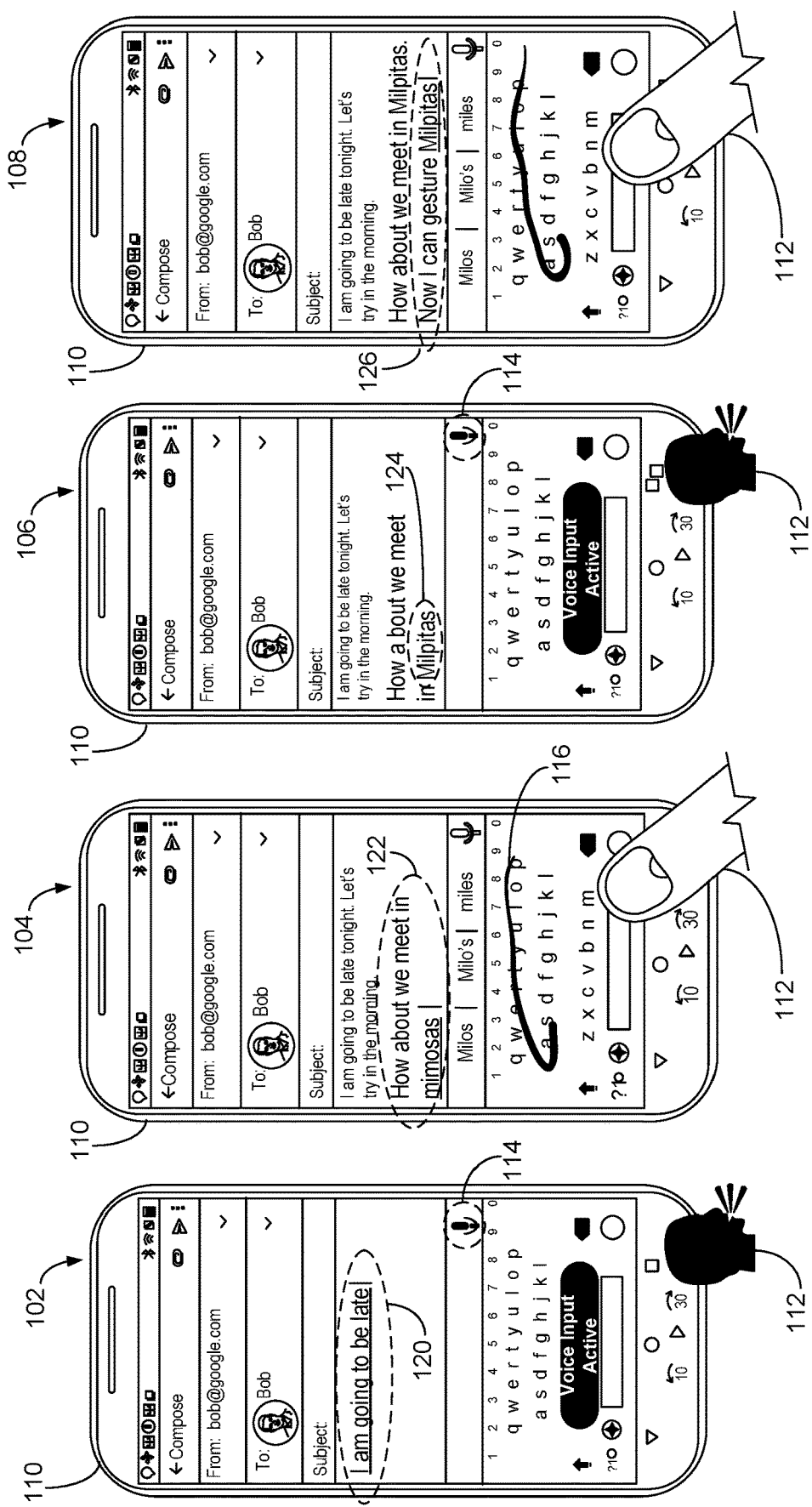
FIG. 1 illustrate multiple interfaces related to cross-modality learning in an example computing system.

FIG. 1 illustrates multiple interfaces related to cross-modality learning in an example computing system. The multiple interfaces include interface 102, 104, 106, and 108. Each illustrated interface corresponds to an example user input screen that can be displayed on a user device 110. As depicted in FIG. 1, in some implementations, user device 110 can correspond to a mobile smartphone device.

In alternative implementations, user device 110 can be one of a variety of computing devices including devices such as laptop/desktop computers, smart televisions, electronic reading devices, streaming content devices, gaming consoles, tablet devices or other related computing devices that are configured to execute software instructions and application programs associated with a voice input method editor (IME) and a keyboard IME.

Interface 102 can be displayed on user device 110 and can include an example user interface of an application program that receives user input from a user 112. In some implementations, the received user input is speech or voice input. As discussed in more detail below with reference to FIG. 2, user device 110 can include at least two IMEs, namely, a keyboard or text IME and a voice or speech IME.

In some implementations, functions associated with each IME can be executed in an example cloud-based computing system accessible by user device 110. In the implementation of FIG. 1, user device 110 can be configured such that the keyboard IME is the default IME and, thus, is the preselected input method option adopted by device 110. Interface 102 can include a digital representation of a microphone 114 that illuminates when user 112 causes device 110 to experience a switch from the keyboard IME to the voice IME.

User 112 of user device 110 can activate a microphone function of device 110 to enable voice dictation. Moreover, interface 102 can be configured to display a message that states "Voice Input Active." The displayed message indicates to user 112 that device 110 is in a voice input mode and can receive speech or voice input. The received speech input can be transcribed locally by device 110 (i.e., client side), or by a cloud-based computing system (i.e., server side), to produce transcription 120.

User 112 can de-activate the microphone function of device 110 to disable voice dictation and switch to the keyboard IME of user device 110. Hence, interface 104 can correspond to a text, touch, keyboard, or physical input mode in which user inputs to device 110 are received by way of a digital or physical keyboard input method. In some implementations, user device 110 is a touch screen device that displays a digital keyboard. The digital keyboard can be configured to receive motion inputs 116 that correspond to swiping motions, graffiti motions, or gesture motions.

Touch or physical inputs received by user device 110 can be depicted as text 122. In some implementations, user 112 attempts to use functionality associated with the keyboard IME to type or enter a particular term. For example, the particular term can be the word "Milpitas." In some implementations, user 112 may type an example text or email message to a friend, Bob. Although not depicted in interface 104, the message can indicate that user 112 suggests to meet Bob in an example location, "Milpitas," a city in Santa Clara County, California.

As discussed in more detail below, the keyboard IME of user device 112 can be coupled to an example language model that includes multiple words associated with multiple languages. However, in this instance the language model does not recognize the typed word "Milpitas." Hence, because the word "Milpitas" is not recognized by the model, autocorrect logic associated with the keyboard IME may, for example, suggest to change or autocorrect Milpitas to "mimosas," as depicted in text 122 of interface 104.

Similarly, autocorrect or spell-check logic associated with the keyboard IME may also indicate, to user 112, that the entered word, "Milpitas," is spelled incorrectly. Thus, as depicted by interface 104, sample words such as "mimosas," "Milos," or "miles" can be suggested by example text suggestion logic associated with the keyboard IME of device 110. In response to user device 110 suggesting to change a particular entered word to another word, user 112 can activate the microphone function of device 110 to enable voice dictation.

Interface 106 and interface 108 provide depictions of one or more operations that are associated with cross-modality learning. Interface 106 depicts an illuminated microphone 114 which occurs when user 112 causes device 110 to experience a switch from the keyboard IME to the voice IME. In some implementations, a cross-modality learning operation can include activating a voice user input mode in which user inputs by way of a voice modality are recognized using a voice modality recognizer.

For example, the switch from the keyboard IME to the voice IME can generally correspond to activating the voice user input mode to enable voice dictation. Further, the voice modality recognizer can generally correspond to the voice IME, while the voice modality can generally correspond to voice input functions of user device 110 in which voice dictation functionality is enabled. As used in this specification, a modality can be a particular input mode, communication channel, or input signal path in which user input of a particular type is received and/or processed by user device 110.

Referring again to the cross-modality learning operation, user input by way of the voice modality can be received by user device 110. The voice IME can be configured to recognize user inputs such as audio input related to human speech that includes multiple word utterances. Further, as a result of the voice IME recognizing the user input, device 110 can obtain a transcription that includes a particular term. For example, in the depiction of interface 106, the particular term can be input provided by user 112 in the form of a human speech utterance of the word "Milpitas."

The learning operation can include obtaining a transcription of the particular term or speech utterance. Hence, as shown by text 124, a transcription of the spoken word "Milpitas" is obtained during the example cross-modality learning operation. In some implementations, user device 110 obtains the transcription based, in part, on data processing operations that occur locally within user device 110. While in some implementations, user device 110 obtains the transcription based, in part, on data processing operations that occur remotely within an example cloud-based or server-based computing system.

In some implementations, although the voice IME can properly recognize the user input and obtain an accurate transcription, the voice IME language model may not include the particular term, "Milpitas." Accordingly, spell-check logic that references the language model associated with the voice IME may not recognize the transcribed term, "Milpitas." Hence, because the word "Milpitas" is not recognized, the spell-check logic may, for example, indicate to user 112 that the transcribed word, "Milpitas," is spelled incorrectly.

In response to receiving this indication, user 112 can disregard the incorrect spelling indication provided by the spell-check logic. Alternatively, in some implementations, user device 110 may prompt user 112 to affirmatively accept the transcribed spelling of the particular term "Milpitas." In interface 104, the depiction of text 124 can be interpreted as an indication that user 112 has accepted the spelling of "Milpitas" as correct.

Upon indication of user 112 accepting the transcribed spelling, the particular term, "Milpitas," received by way of the voice modality will then be added or saved to one or more language models associated with the voice IME. Once added to the language models, the particular term can be accessible for use in subsequent speech-to-text communications. For example, once stored in the language models, the word "Milpitas" can be used in subsequent communications without triggering the occurrence of autocorrect logic or spell-check logic.

The cross-modality learning operation can further include, generating an input context data structure that references at least the particular term. For example, an input context data structure can be generated that includes at least the term "Milpitas" as well as multiple other items associated with the received user input. In some implementations, the multiple other items can include an example application program used to enter the particular term and a time and/or date that indicates when the particular term was received.

The cross-modality learning operation can further include the voice modality recognizer transmitting the input context data structure to a keyboard or physical input modality recognizer for use in updating a keyboard modality recognition model associated with the keyboard modality recognizer.

For example, an input context data structure can be transmitted by the voice IME to the keyboard IME. The input context data structure can include the term "Milpitas," an indication of a text/email message application program used to input "Milpitas," and the data/time in which user 112 entered "Milpitas" by way of the voice input method. The keyboard IME can be associated with a keyboard modality recognition model that includes at least a spatial model (described below) and a language model.

Interface 108 shows text 126 being input, to user device 110, via the keyboard or physical input mode. In some implementations, the transmitted input context data structure can be used to update a keyboard language model that is accessed by the keyboard IME. The updated keyboard language model enables user 112 to input text communication that includes the particular term "Milpitas" so that the term is appropriately recognized by spell-check and/or autocorrect logic associated with the keyboard IME. Further, as indicated by text 126, user 112 can swipe or gesture the term "Milpitas" based on the spatial model and language model of the keyboard IME being updated to include the particular term "Milpitas."

Figure 2:
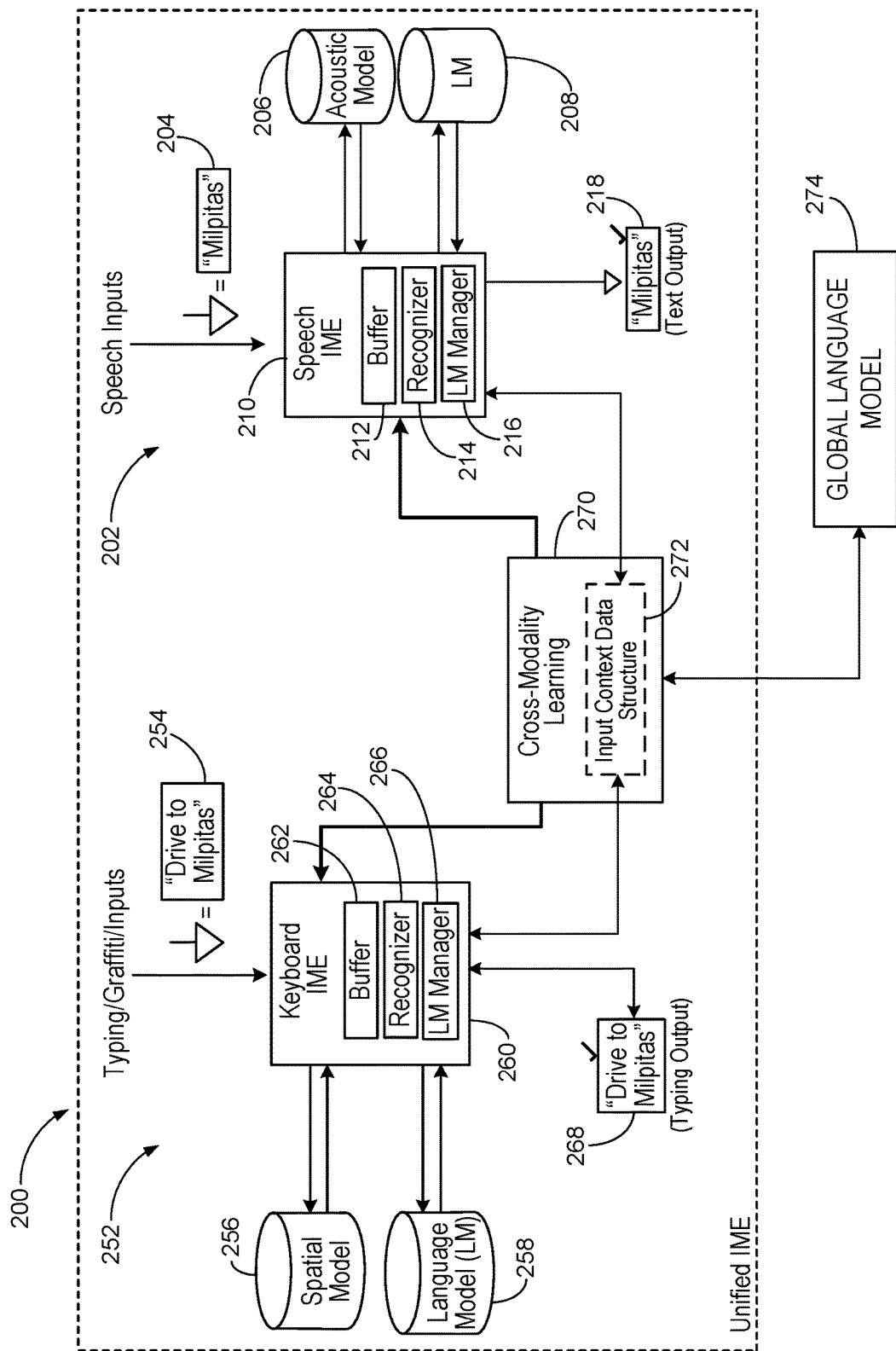
FIG. 2 illustrates a system diagram of an example computing system for cross-modality learning.

FIG. 2 illustrates a system diagram of an example computing system 200 for cross-modality learning. System 200 generally includes a speech modality recognition model 202 (speech model 202), a keyboard modality recognition model 252 (keyboard model 252), a cross-modality learning module 270 (learning module 270), and a global language model 274 (global LM 274).

As used in this specification, the term "module" is intended to include, but is not limited to, one or more computers configured to execute one or more software programs that include program code that causes a processing device(s) of the computer to execute one or more functions. The term "computer" is intended to include any data processing device, such as a desktop computer, a laptop computer, a mainframe computer, a tablet device, a server, a handheld device, a mobile or smartphone device or any other device able to process data.

Speech model 202 can include an acoustic model 206, a speech language model 208, and a speech IME 210. Speech model 202 is generally configured to receive audio input 204 and execute a variety of data and signal processing functions to identify and extract one or more words associated with human speech spoken in a particular language.

Speech model 202 can be used in conjunction with one or more application programs that are accessible from user device 110. In some implementations, speech model 202 can be formed, in part, from software or program code executing in modules, processor devices, or circuit components that are disposed locally within user device 110. While, in other implementations, speech model 202 can be associated with non-local, cloud, or server-based computing systems that receive and process audio signal transmissions from device 110.

Acoustic model 206 can be an example acoustic model used in speech recognition to associate relationships between an audio signal and phonemes or other linguistic properties that form speech audio. In general, acoustic model 206 can interact with speech IME 210 to identify and associate certain received utterances that exhibit acoustical characteristics that align with the acoustics associated with an example spoken word such as "MILPITAS."

Language model 208 can be an example language model used in speech recognition to specify or identify certain word combinations or sequences. In some implementations, model 208 can be configured to generate a word sequence probability factor which can be used to indicate the likely occurrence or existence of particular word sequences or word combinations. The identified word sequences correspond primarily to sequences that are specific to speech corpus rather than to written corpus.

Speech IME 210 can include a speech buffer 212, a recognizer 214 and a LM manager 216. Speech buffer 212, and buffer 262, can each include one or more memory units configured to temporarily buffer or store speech or audio signals for data or signal processing by speech model 202. Speech buffers 212, 262 can include one or more non-transitory machine-readable storage mediums. The non-transitory machine-readable storage mediums can include solid-state memory, magnetic disk, and optical disk, a random access memory (RAM), a read-only memory (ROM), an erasable programmable read-only memory (e.g., EPROM, EEPROM, or Flash memory), or any other tangible medium capable of storing information.

In addition to their respective buffers, 212 and 262, speech IME 210 and keyboard IME 260 (described below) can each include multiple processing devices. The processing devices can include one or more processors (e.g., microprocessors or central processing units (CPUs)), graphics processing units (GPUs), application specific integrated circuits (ASICs), or a combination of different processors. In alternative implementations, system 200 can include other computing resources/devices, e.g., cloud-based servers, that provide additional processing options for performing one or more of the determinations and calculations described in this specification.

The processing devices can generally include one or more memory units or memory banks that are non-transitory machine-readable storage mediums. In some implementations, the processing devices execute programmed instructions stored in the memory units to cause system 200 and its associated components to perform one or more functions described in this specification.

In some implementations, recognizer 214 can be example speech recognition logic, programmed instructions, or algorithms that are executed by one or more processors of speech IME 210. For example, recognizer 214 can execute program code to manage identification, extraction, and analysis of characteristics of the received audio input 204. Further, recognizer 214 can execute comparator logic to compare characteristics of the received audio input 204 to various model parameters stored in acoustic model 206 and language model 208. Results of the comparison can yield text transcription outputs that correspond substantially to speech utterances provided by one or more users 112 of system 200.

LM manager 216 can include example access or management logic that controls and/or manages access to one or more model parameters of language model 208. For example, LM manager 216 can be configured to access certain parameters of language model 208 based on particular characteristics of received audio input 204 that are identified and analyzed by recognizer 214. For example, recognizer 214 may identify a characteristic of the received audio input 204 as including one or more word utterances that correspond to the English or Spanish languages. Thus, LM manager 216 will access model parameters of language model 208 that are associated with either the spoken English language, the spoken Spanish language, or both.

In general, recognizer 214 and LM manager 216 can interact or cooperate to execute a variety of data processing and signal processing functions. Execution of these functions enable completion of process steps necessary to perform speech audio input recognition and to convert the speech audio to text transcription.

As noted above, speech model 202, as well as keyboard model 252, can each be used in conjunction with one or more application programs that are accessible from user device 110. Example application programs can include an email application, a text message application, an instant messaging application, a web browsing application, a mapping application, or any other application program configured to receive user input such as speech audio input, digital text input, alpha-numeric input, character input, or digital image input.

Cross-modality learning module 270 can be configured to execute program code to, in part, generate input context data structures for transmission between speech model 202 and keyboard model 252 as well as between learning module 270 and global language model 274. In some implementations, learning module 270 can aggregate multiple parameter values based on parameter signals received from processors of user device 110, voice IME 210, and keyboard IME 262.

For example, learning module 270 can receive parameters values that indicate particular application programs used in conjunction with the respective IMEs of system 200 to receive text or speech user inputs. Moreover, user device 110 can provide date and time parameters that indicate when a particular speech or typed term and associated context words are received by the respective IMEs. Additionally, the respective IME's can provide n-gram contexts or a full transcription lattice associated with received speech or typed input.

Learning module 270 can generate input context data structure(s) 272 based on the received parameter values and facilitate transmission of the generated data structures 272 between the respective IMEs 210, 260 and between learning module 270 and global LM 274. In some implementations, global LM 274 receives input context data structures 272 from learning module 270 that are used, by global LM 274, to update language models that are accessible globally to a multitude of users.

In some implementations, system 200 can provide one or more parameter values or data structures 272 to generate a database that includes multiple user inputs received, by system 200, through a keyboard or voice modality. The parameter values and data structures 272 can include one or more particular terms or new words. The database can be associated, at least in part, with global language model 274. Further, in some implementations, global LM 274 can include a variety of individual language models that correspond to a variety of different spoken languages and input modalities. System 200 can use at least one user input of the database of multiple user inputs to update the one or more language models of global LM 274.

In alternative implementations, global LM 274 can provide, to learning module 270, data structures and/or parameter values that can include new words or particular terms received from other global users. Learning module 270 can then generate one or more input context data structures 272 which are then transmitted to one of speech model 202 or keyboard model 252 to update their respective language models 208 and 258. Hence, in some implementations, keyboard IME 260 and speech IME 210 can learn new particular terms based on parameters or data structures received from global LM 274.

Keyboard model 252 can include a spatial model 256, a language model 258, and a keyboard IME 260. Keyboard model 252 is generally configured to receive touch/physical keyboard inputs 254 that correspond to letters, numbers, and other characters that are displayed as digital text that form words or phrases.

Much like speech model 202 discussed above, keyboard model 252 can also be formed, in part, from software or program code executing in modules, processor devices, or circuit components that are disposed locally within user device 110. While, in other implementations, keyboard model 252 can be associated with non-local, cloud, or server-based computing systems that receive and process audio signal transmissions from device 110.

Aside from spatial model 256, technical descriptions of the functions for language model 258 and keyboard IME 260 can be similar to descriptions of language model 208 and speech IME 210 discussed above. For clarity and brevity, language model 258 can be described by noting technical distinctions relative to language model 208. Likewise, keyboard IME 260 can be described by noting technical distinctions relative to speech IME 210.

Language model 258 can be used in keyboard text recognition to identify certain letter combinations or sequences. In some implementations, model 258 can be configured to generate a letter or word sequence probability factor that can be used to indicate the likely occurrence or existence of particular letter sequences or word combinations. The identified letter and word sequences correspond primarily to sequences that are specific to written corpus rather than to speech corpus.

In some implementations, recognizer 264 can be text recognition logic, programmed instructions, or algorithms that are executed by one or more processors of keyboard IME 260. For example, recognizer 264 can execute program code to manage identification, extraction, and analysis of characteristics of the received text input 254. Further, recognizer 214 can execute comparator logic to compare spatial characteristics of the received text input 254 to various model parameters stored in spatial model 256 and language model 258.

Spatial model 256 can be an example spatial model used in text prediction to associate spatial coordinates of letters or spatial relationships between letters to predict typed, swiped, or gestured words that are input via a keyboard of user device 110. In general, spatial model 256 can interact with keyboard IME 260 to identify and associate keyboard inputs that correspond spatially with letters that form words associated with certain written corpus.

System 200 generally can include the following operational processes and functions. User 112 can speak to user device 110 or provide speech input that includes word utterances that are not included in or known by language model 208 or speech IME 210. For example, user 112 can speak to user device 110 by saying a particular term such as "Milpitas." Acoustic model 206 can interact with other components of speech model 202 to accurately transcribed the spoken input 204 so that "Milpitas" is displayed as text 218 in an example application program.

In some implementations, user 112 will indicate to the application program that user 112 accepts the transcribed spelling of the particular term. For example, speech model 202 can execute program code to detect or determine if user 112 has modified the transcription generated by speech model 202. In some implementations, is user 112 proceeds to enter additional speech input or manually type/input text that precedes or comes after "Milpitas," without modifying the proposed transcription text 218, then speech model 202 can determine that user 112 has accepted the speech to text transcription 218.

If speech model 202 determines that user 112 has accepted the transcribed term "Milpitas," system 200 can store the particular term in language model 208 and/or global LM 274. In some implementations, when system 200 stores previously unknown particular terms in the various respective language models of the system, these storage operations can effectively constitute real-time learning functions.

In general, system 200 can execute data processing and storage operations such that the system, and its associated IME's, can learn new spoken terms both through server-side cloud based learning process as well as local client side learning processes. Stated another way, the first time user 112 says a new word to device 110 and speech model 202 is able to recognize an utterance that aligns with parameters of acoustic model 206 and that is accepted as a correct transcription by the user; system 200 will recognize the word, save the word to speech LM 208, and transmit a data structure that includes the word.

The transmitted data structure will be received by at least keyboard model 252 for use by keyboard IME 260. Thus, when user 112 subsequently and accurately types, gestures or swipes the particular text string for "Milpitas," keyboard IME 260 will recognize the word as being known by language model 258. Hence, system 200 will learn the particular term, save to the term for use by voice/speech IME 210 and transfer it to keyboard IME 260 so that the particular term can also be learned by keyboard model 252 while user 112 types or speaks other input content to device 110.

In some implementations, after a particular input context data structure 272 is transmitted by speech IME 210, and received by keyboard IME 260, user 112 can then activate the keyboard modality input mode. In this mode, user inputs by way of the keyboard/text modality are recognized using keyboard modality recognizer, i.e., keyboard IME 260. System 200 can then receive user input 254 by way of the keyboard modality and input 254 can include the particular term "Milpitas." Keyboard model 252 learns the particular term "Milpitas" in response to speech IME 210 and/or learning module 270 transmitting input context data structure 272. Subsequent to learning the particular term, keyboard IME 260 can then recognize the particular term received by way of the keyboard/text modality.

In some implementations, recognizing the particular term "Milpitas" by keyboard IME 260 can include a display of user device 110 providing an indication to user 112. For example, the display can indicate to user 112 that the particular term has been added or saved to language model 258. In some implementations, after "Milpitas" is added to LM 258, user 112 can type an example text phrase such as "Drive to Milpitas" and receive a general indication that the word is recognized by keyboard model 252. For example, the indication can correspond to a text display 268 that includes the word "Milpitas" without triggering, for example, spellcheck or autocorrect logic associated with model 252.

In some implementations, system 200 can be configured to detect the occurrence of user inputs received by keyboard model 252 that include text content or a text lattice that references at least the particular term, e.g., "Milpitas." For example, system 200 can be configured to detect when an example phrase or text lattice such as "Drive to Milpitas" is received by keyboard IME 260. In general, system 200 will detect occurrences of the particular term after first having learned the particular term.

In response to detecting text content that references the particular term, system 200 can increment a first data count that tracks a number of occurrences in which text content that references the particular term is received by way of the keyboard modality. In some implementations, system 200 can also increment a second data count that tracks a number of occurrences in which user inputs that correspond to the particular term are received by way of the second modality. For example, in addition to detecting and incrementing data counts for a received text lattice that includes the particular term, system 200 can also detect and increment data counts that track individual occurrences of the particular term rather than occurrences of a text lattice that includes the particular term.

In some implementations, the first and second data counts can be used, by system 200, to generate data sets of aggregated statistics that are associated with the particular term. Other statistics in the data sets can include, for example, variations on spelling and capitalization of the particular term. Further, statistical data can be aggregated relating to contextual variations that indicate use of the particular term in a variety of different text or speech contexts, e.g., "Drive to Milpitas," "Meet at MILPITAS," "Let's eat at milpitaas." In some implementations, the generated data sets of aggregated statistics can be used by system 200 to bias, improve or enhance keyboard input or voice input learning functions within the respective models 202, 252.

In other implementations, the generated data sets of aggregated statistics can be transmitted to global LM 274. For example, global LM 274 can receive a variety of inputs, from system 200, associated with disparate users that may be attempting to enter the particular term "Milpitas." As indicated in the preceding paragraph, in some instances, one or more users of system 200 may spell "Milpitas" incorrectly or may use improper capitalization. Such incorrect or improper uses of the particular term may not be used to update the one or more language models of global LM 274. Alternatively, for instances in which the particular term is used correctly by a threshold number of users 112, system 200 will cause the language models of global LM 274 to be updated with the most appropriate use of the particular term.

Figure 3:
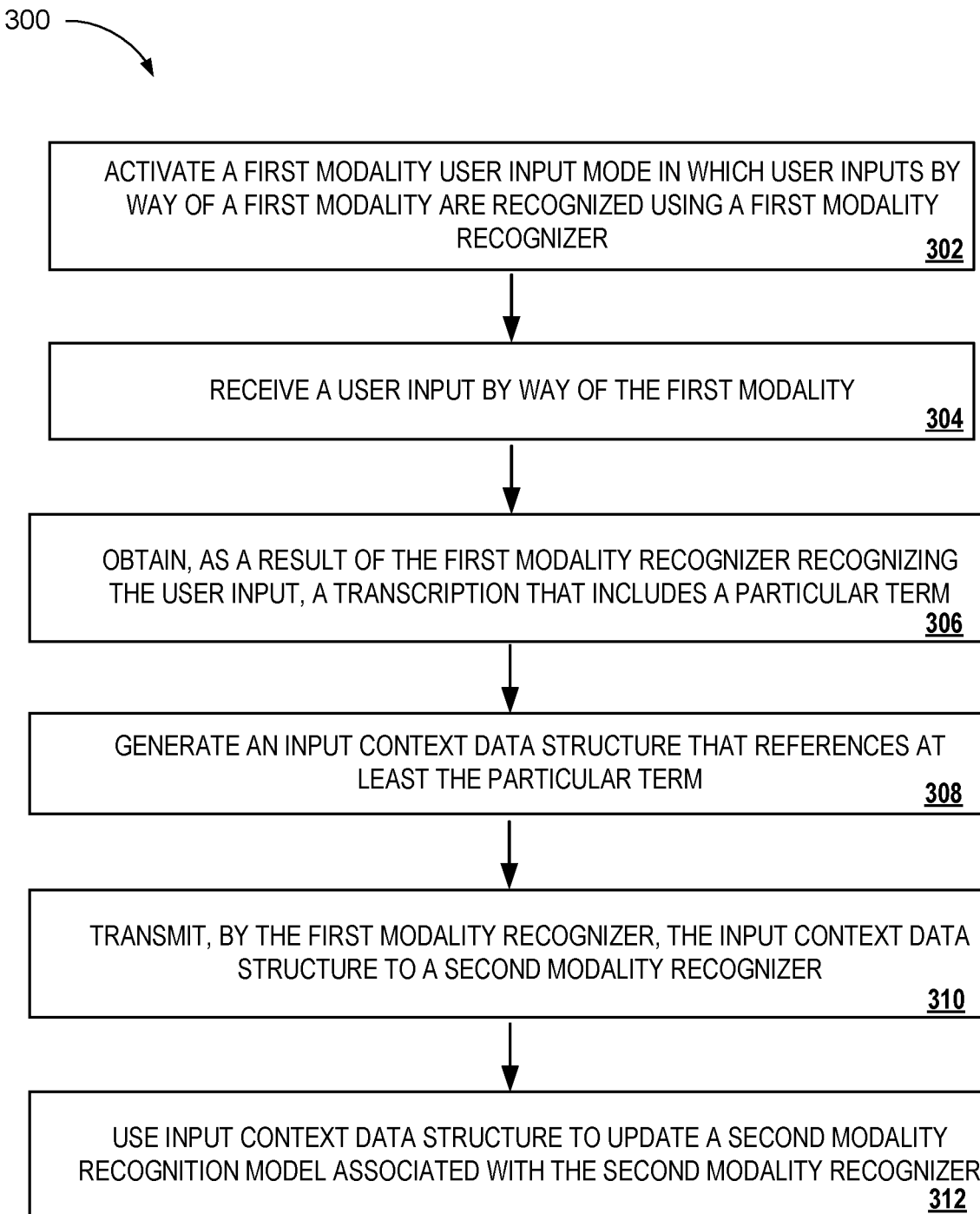
FIG. 3 is a flow diagram of an example process for cross-modality learning.

FIG. 3 is a flow diagram of an example process 300 for cross-modality learning. At block 302 process 300 includes activating a first modality user input mode in which user inputs by way of a first modality are recognized using a first modality recognizer. In some implementations, activating the first modality user input mode includes switching from a keyboard IME to a voice IME in an example mobile device such as device 110. The first modality can correspond to a voice modality relating to voice input functions of user device 110 in which voice dictation is enabled. Additionally, the first modality recognizer can correspond to voice IME 210.

At block 304 process 300 receives user input by way of the first modality. In some implementations, the received user input can be audio input corresponding to human speech that includes one or more word utterances. Further, the received user input can include one or more particular terms that are recognized by voice IME 210.

At block 306, as a result of the first modality recognizer recognizing the user input, process 300 obtains a transcription that includes the particular term. In some implementations, recognizing the user input can include a voice recognition model of system 200 processing the audio input to parse out one or more words. The parsed words can include the particular term and system 200 can generate text transcriptions based on the parsed words that are recognized from the received speech utterance. In some implementations, transcriptions are generated, in part, by a remote server or cloud-based computing system. The generated transcriptions can be subsequently obtained, by device 110, from the computing system.

At block 308 process 300 includes generating an input context data structure that references at least the particular term. In some implementations, the input context data structure can include the particular term as well as other items such as an example application program used to enter the particular term, one or more n-grams of the speech utterance of the user input, and a time and/or date that indicates when the particular term was received.

At block 310, process 300 includes transmitting, by the first modality recognizer, the input context data structure to a second modality recognizer. At block 312 of process 300, the transmitted input context data structure is used to update a second modality recognition model associated with the second modality recognizer. The second modality can correspond to a keyboard or physical input modality relating to keyboard input functions of user device 110 in which a digital or physical keyboard is used to input text content. Additionally, the second modality recognizer can correspond to keyboard IME 260.

In some implementations, the second modality recognition model can correspond to keyboard modality recognition model 252 that includes at least spatial model 256 and language model 258. In some implementations, the transmitted input context data structure can be used to update a keyboard language model that is accessed by the keyboard IME. The updated keyboard language model can enable user device 110 to receive input text communication that includes the particular term such that the term can be appropriately recognized by, for example, spell-check and/or autocorrect logic associated with the keyboard IME.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

Figure 4:
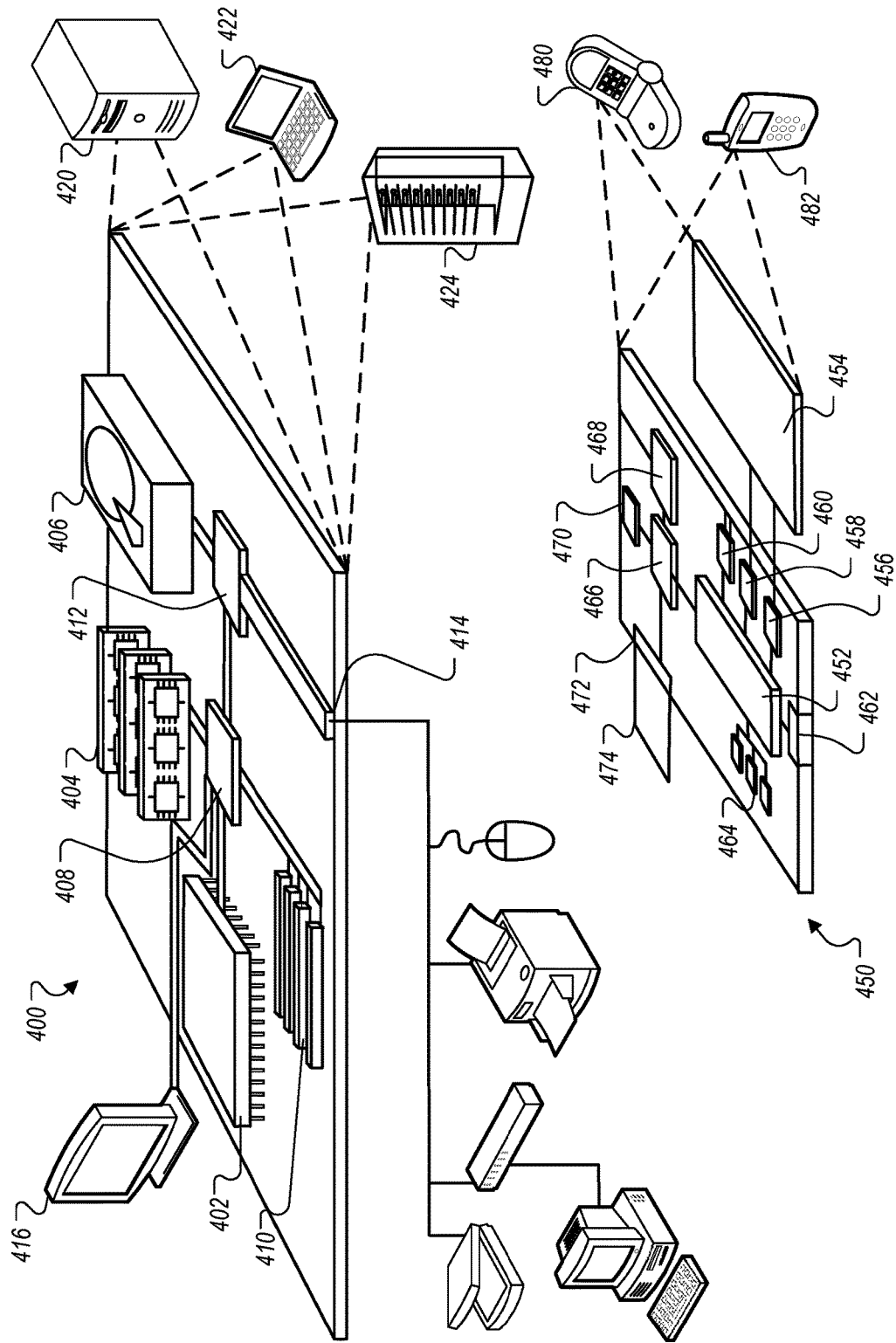
FIG. 4 is a block diagram of a computing system that can be used in connection with computer-implemented methods described in this specification.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
    receiving, by a computing device and from a first plurality of cross-modality learning systems associated with a respective first plurality of user devices, aggregated statistics related to one or more variations of a particular term as received by the respective first plurality of user devices;
    analyzing, by the computing device, the aggregated statistics to determine that a given variation of the one or more variations has been accepted as a correct version of the particular term by a second plurality of users;
    upon a determination that the given variation has been accepted as the correct version, updating a global language model associated with the computing device;
    generating, by the computing device and based on the updated global language model, one or more parameters associated with the correct version of the particular term, the one or more generated parameters, when transmitted to modality recognition models associated with the first plurality of cross-modality learning systems, improve input recognition by the modality recognition models by causing the modality recognition models to recognize a previously unrecognizable term; and
    sharing, by the computing device and with the first plurality of cross-modality learning systems, the one or more parameters, each given cross-modality learning system of the first plurality of cross-modality learning systems having been configured to provide the one or more parameters to a modality recognition model associated with an input mode at a respective given user device, and
    wherein the sharing causes the modality recognition model to automatically learn the correct version of the particular term based on the one or more parameters, so that upon receiving, at the given user device, a subsequent user input via the input mode, wherein the subsequent user input was previously unrecognizable by the modality recognition model prior to the automatic learning, the modality recognition model is able to recognize the subsequent user input via the input mode.

2. The computer-implemented method of claim 1, wherein the one or more variations of the particular term comprise one or more spoken variations of the particular term.

3. The computer-implemented method of claim 1, wherein the one or more variations of the particular term comprise one or more textual variations of the particular term.

4. The computer-implemented method of claim 1, wherein the particular term is a spoken term, and wherein the one or more variations of the particular term comprise one or more transcribed versions of the spoken term.

5. The computer-implemented method of claim 1, wherein the receiving of the one or more variations of the particular term further comprises:
    receiving contextual data associated with an input of the particular term.

6. The computer-implemented method of claim 1, wherein the receiving of the one or more variations of the particular term comprises receiving an indication that a given variation of the one or more variations has been accepted as a correct version of the particular term,
   wherein the determining of whether to update the global language model comprises determining that the given variation has been accepted as the correct version by more than a threshold number of users, and
   wherein the updating of the global language model comprises updating the global language model with the correct version of the particular term.

7. The computer-implemented method of claim 1, wherein the receiving of the one or more variations of the particular term comprises receiving an indication that a given variation of the one or more variations has been rejected as an incorrect version of the particular term, and
   wherein the determining of whether to update the global language model comprises:
      determining that the given variation has been rejected as the incorrect version by more than a threshold number of users, and
      determining not to update the global language model.

8. The computer-implemented method of claim 1, further comprising:
   receiving, from a user device of the plurality of user devices, a previously unknown term, and an indication that the previously unknown term has been accepted by a user of the user device;
   updating the global language model to add the previously unknown term; and
   sharing, by the computing device and with the plurality of user devices, the previously unknown term.

9. The computer-implemented method of claim 1, further comprising:
   receiving, from a user device of the plurality of user devices, an audio version of the particular term, a transcribed version of the audio version, and an indication that the transcribed version has been accepted as a correctly transcribed version of the audio version;
   updating the global language model with data parameters associated with the audio version of the particular term, the transcribed version, and the indication that the transcribed version is the correctly transcribed version of the audio version; and
   sharing, by the computing device and with the plurality of user devices, the data parameters.

10. The computer-implemented method of claim 1, further comprising:
    receiving, from a user device of the plurality of user devices, aggregated statistics associated with the particular term, and
    wherein the updating of the global language model is based on the aggregated statistics.

11. A computer-implemented method, comprising:
    accessing, by a cross-modality learning system of a user device and from a computing device, a global language model associated with the computing device, the global language model is updated based on a determination that a given variation of one or more variations of a particular term received by the computing device from a first plurality of cross-modality learning systems associated with a respective first plurality of user devices has been accepted as a correct version of the particular term by a second plurality of users;
    receiving, by the cross-modality learning system and from the computing device, one or more parameters associated with the correct version of the particular term, the one or more parameters, when received by the cross-modality learning system and shared with modality recognition models, improve input recognition by the modality recognition models by causing the modality recognition models to recognize a previously unrecognizable term;
    providing, by the cross-modality learning system at the user device and based on the global language model, the one or more parameters to a modality recognition model associated with an input mode, wherein the modality recognition model is configured to automatically learn the correct version of the particular term based on the one or more parameters;
    receiving, by the input mode, a subsequent user input related to another variation of the particular term, wherein the subsequent user input was previously unrecognizable by the modality recognition model prior to the automatic learning; and
    automatically recognizing, based on the learning of the correct version of the particular term, the subsequent user input by the modality recognition model associated with the input mode.

12. The computer-implemented method of claim 11, wherein the one or more variations of the particular term comprise one or more spoken variations of the particular term.

13. The computer-implemented method of claim 11, wherein the one or more variations of the particular term comprise one or more textual variations of the particular term.

14. The computer-implemented method of claim 11, wherein the particular term is a spoken term, and wherein the one or more variations of the particular term comprise one or more transcribed versions of the spoken term.

15. The computer-implemented method of claim 11, wherein the accessing of the global language model further comprises:
    accessing contextual data associated with an input of the particular term.

16. The computer-implemented method of claim 11, further comprising:
    receiving, by the first input mode, a second user input, wherein the second user input is a variation of the particular term;
    determining, at the computing device, that the first modality recognition model associated with the first input mode does not recognize the second user input;
    receiving a user indication that the second user input is a correct version of the particular term;
    adding the second user input to the first modality recognition model;
    updating a second modality recognition model, wherein the updating causes the second modality recognition model to automatically recognize a subsequent user input via a second input mode associated with the second modality recognition model, wherein the subsequent user input is related to the particular term; and
    sending, to the computing device, the second user input and an indication that the second user input has been accepted as a correct version of the particular term.

17. The method of claim 16, wherein the first modality recognition model corresponds to a first language model, and the second modality recognition model corresponds to a second language model.

18. The method of claim 16, wherein the first modality recognition model corresponds to a language model, and the second modality recognition model corresponds to a spatial model.

19. The method of claim 16, wherein the first modality recognition model corresponds to a spatial model, and the second modality recognition model corresponds to an acoustic model.

20. The method of claim 16, wherein the first input mode corresponds to a voice-based input mode, and the second input mode corresponds to a keyboard-based input mode.

21. The method of claim 16, wherein the first input mode corresponds to a keyboard-based input mode, and the second input mode corresponds to a voice-based input mode.

22. A computing device, comprising:
one or more processors; and
data storage, wherein the data storage has stored thereon computer-executable instructions that, when executed by the one or more processors, cause the computing device to perform one or more operations comprising:
receiving, by a computing device and from a first plurality of cross-modality learning systems associated with a respective first plurality of user devices, aggregated statistics related to one or more variations of a particular term as received by the respective first plurality of user devices;
analyzing, by the computing device, the aggregated statistics to determine that a given variation of the one or more variations has been accepted as a correct version of the particular term by a second plurality of users;
upon a determination that the given variation has been accepted as the correct version updating, a global language model associated with the computing device;
generating, by the computing device and based on the updated global language model, one or more parameters associated with the correct version of the particular term, the one or more generated parameters, when transmitted to modality recognition models associated with the first plurality of cross-modality learning systems, improve input recognition by the modality recognition models by causing the modality recognition models to recognize a previously unrecognizable term; and
sharing, by the computing device and with the first plurality of cross-modality learning systems, the one or more parameters, each given cross-modality learning system of the first plurality of cross-modality learning systems having been configured to provide the one or more parameters to a modality recognition model associated with an input mode at a respective given user device, and
wherein the sharing causes the modality recognition model to automatically learn the correct version of the particular term based on the one or more parameters, so that upon receiving, at the given user device, a subsequent user input via the input mode, wherein the subsequent user input was previously unrecognizable by the modality recognition model prior to the automatic learning, the modality recognition model is able to recognize the subsequent user input via the input mode.

* * * * *